United States Patent [19]

Loscoe et al.

[11] Patent Number: 4,729,625
[45] Date of Patent: Mar. 8, 1988

[54] OPTICAL FIBER SPLICE SLED

[75] Inventors: Claire E. Loscoe, Howell, N.J.; Joseph F. Larkin, Holland, Pa.

[73] Assignee: The United States of America as represented by the Secretary of the Army, Washington, D.C.

[21] Appl. No.: 628,091

[22] Filed: Jul. 5, 1984

Related U.S. Application Data

[63] Continuation-in-part of Ser. No. 511,423, Jul. 6, 1983, abandoned.

[51] Int. Cl.⁴ .............................................. G02B 6/38
[52] U.S. Cl. ................................. 350/96.21; 350/96.20
[58] Field of Search ............... 350/96.10, 96.15, 96.16, 350/96.20, 96.21, 96.22

[56] References Cited

U.S. PATENT DOCUMENTS

| | | | |
|---|---|---|---|
| 4,045,121 | 8/1977 | Clark | 350/96.21 X |
| 4,088,386 | 5/1978 | Hawk | 350/96.21 |
| 4,257,674 | 3/1981 | Griffin et al. | 350/96.21 |
| 4,428,645 | 1/1984 | Korbelak et al. | 350/96.20 |
| 4,602,845 | 7/1986 | Anderton | 350/96.21 |
| 4,676,589 | 6/1987 | Miyashita et al. | 350/96.21 |
| 4,678,272 | 7/1987 | Finn et al. | 350/96.21 |

FOREIGN PATENT DOCUMENTS 57-85015  5/1982  Japan .................. 350/96.20

OTHER PUBLICATIONS

Hodge et al, "Repair of Fiber Optic Cable in the Field" 7 pp. (no date).
Hodge, "A Low Loss Single Fiber Connector Alignment Guide 1978 Fiber Optics Conf. Pro. pp. 111-115.

*Primary Examiner*—William L. Sikes
*Assistant Examiner*—Brian M. Healy
*Attorney, Agent, or Firm*—Sheldon Kanars; Jeremiah G. Murray; Edward Goldberg

[57] ABSTRACT

A housing for optical fibers to be spliced including a pair of movable sleds for supporting the opposing fibers and directing the fibers into opposite ends of a central alignment guide. Retainer sleeves crimped about the cable ends and locator sleeves crimped around individual coated fibers are positioned in slots in each sled to provide precise locations for the fibers. Grooves in the sleds align the fibers for insertion into the guide upon positioning the sleds in recesses at each end of the housing. Movement of the sleds feeds the stripped and cleaved fiber ends through internally tapered rings and into the ends of the alignment guide. Two or more fibers from respective cable ends may be supported on each sled to provide two or more splices in the same housing. The housing device is readily assembled with the fibers aligned and held securely in place so that negligible optical losses result. The housing includes hinged upper and lower halves which are latched together to secure and protect the spliced fibers.

13 Claims, 7 Drawing Figures

OPTICAL FIBER SPLICE SLED

The invention described herein may be manufactured and used by or for the Government for governmental purposes without the payment to us of any royalties thereon or therefor.

This is a continuation-in-part of application Ser. No. 511,423, filed July 6, 1983, and now abandoned.

BACKGROUND OF THE INVENTION

1. Field of the Invention

This invention relates to optical fiber splices for the repair of optical communication cable and particularly to a removable support structure in a housing for holding and aligning the fibers to be spliced.

2. Description of the Prior Art

The alignment and splicing of optical fibers has been accomplished in the past utilizing such devices as described in a publication entitled "A Low Loss Single Fiber Connector Alignment Guide" by Malcolm H. Hodge in the 1978 Fiber Optics Conference Proceedings, pp. 111–115, and in U.S. Pat. No. 4,257,674, entitled "Elastomeric Fiber Optic Splice", issued Mar. 24, 1981. The described tubular alignment guide includes four fused glass rods having elbows at opposite ends and internal vee-grooves formed by the cusps within the rods. Optical fibers inserted into opposite ends are bent into engagement along a common groove surface to align the fiber ends. Proper cleaving of the fiber ends and a silicone fluid within the guide at the interface minimize optical insertion losses. The alignment guide, however, does not provide protection, and requires careful threading for insertion of the fibers into the small tubular structure.

The splice assembly of the above-noted patent utilizes another guide having two mating longitudinal inserts of an elastomeric material within an outer sleeve. One insert has an inner groove along its length and the other a flat surface which together preferably form a triangular-shaped opening. Insertion of the fibers expands the walls of the opening to force the inserts against the sleeve. A slide and cam at each end of the housing position and bend the fiber for insertion into the central guide, and strain relief members secure the fibers at the outer ends. After the two opposing fibers are aligned, the cams are unlocked and the top lid of the housing snapped in place. This structure does not secure and position cable strength members and jacket as well as the fibers, does not retain the splice ends since the cams are released to avoid microbending losses, and the slide is not mechanically restrained. Insertion of the fibers into the alignment guide may also require careful manipulation.

Another housing for an optical fiber cable splice has been described in a paper presented at an August 1982 SPIE International Technical Symposium, entitled "Repair of Fiber Optic Cable in the Field," by M. H. Hodge, J. G. Woods, J. F. Larkin, and C. E. Loscoe, the latter two being the present inventors. This paper concerns a fiber optic splicing system utilizing a manually operated splicing machine in conjunction with a housing having recesses for directly receiving various preassembled splice components. This structure, however, does not permit mounting the elements in a separate removable support device for facilitating insertion of the fibers into the alignment guide and for retaining the spliced fibers in position.

SUMMARY OF THE INVENTION

It is therefore the primary object of the present invention to provide a simple and reliable device for splicing optical fibers which can be used rapidly and easily under adverse conditions.

It is a further object of the invention to provide an optical fiber splicing device which holds the cable and individual fibers in precise locations and which is movable toward the alignment guide to insert the fiber ends therein without requiring careful manipulation.

An additional object of the present invention is to provide a removable slidable support for simultaneously aligning and splicing a plurality of optical fibers which are held in position upon insertion of the support within a protective housing.

These objects are achieved with a pair of removable slidable optical fiber sleds which fit into recesses at opposite ends of the lower half of a housing having a central alignment guide. A cable end having two or more inner buffer-coated fibers to be spliced is positioned on the sled by means of a flanged sleeve and a retainer sleeve which is crimped to secure the strength members of the cable between the flanged sleeve and the retainer sleeve. The flanged sleeve positions the cable by placement in a transverse slot on each sled. Locator sleeves containing an elastomeric insert protruding from at least the proximal end of the locator sleeve (proximal meaning nearest to the central alignment guide) are positioned and crimped on each coated fiber to precisely locate each fiber in intermediate longitudinal slots in each sled. The buffer-coated fibers are held in grooves to precisely position the stripped and cleaved fiber ends for insertion into the alignment guide. Movement of the sled toward the guide causes the fiber ends to pass through internally tapered rings and into the guide. A hinged upper half of the housing is closed over the lower half and a latch secures the spliced fibers and elements in position within the housing.

Other objects and advantages will become apparent from the following description in conjunction with the accompanying drawings.

DESCRIPTION OF THE PREFERRED EMBODIMENT

Figure 1:
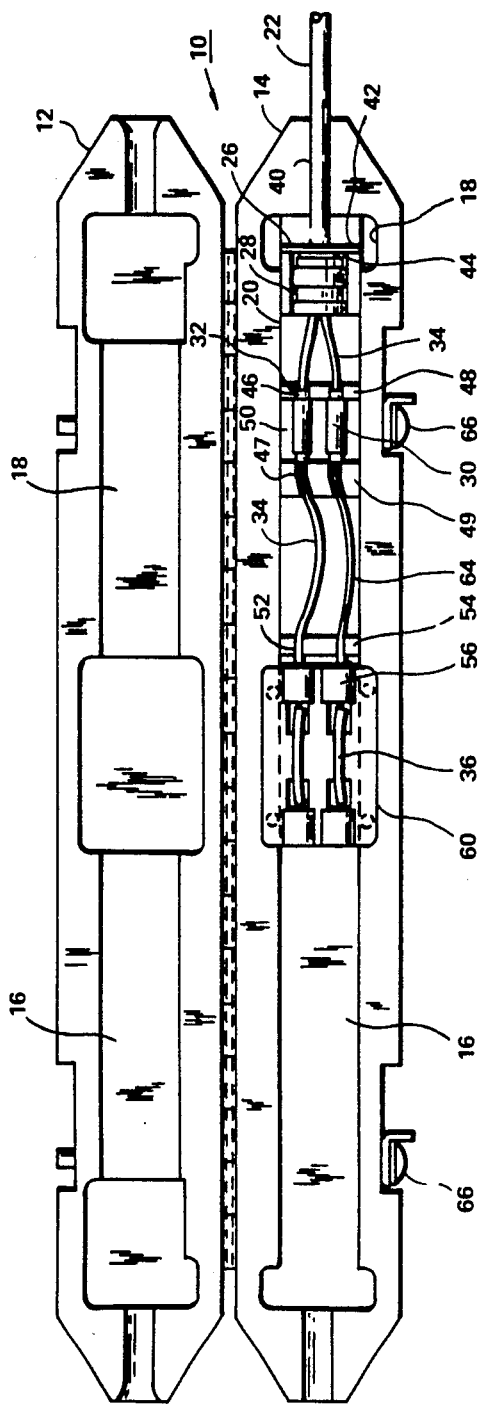
FIG. 1 is a plan view of an open housing including a removable splice sled and elements for aligning and splicing the fibers.
Figure 2:
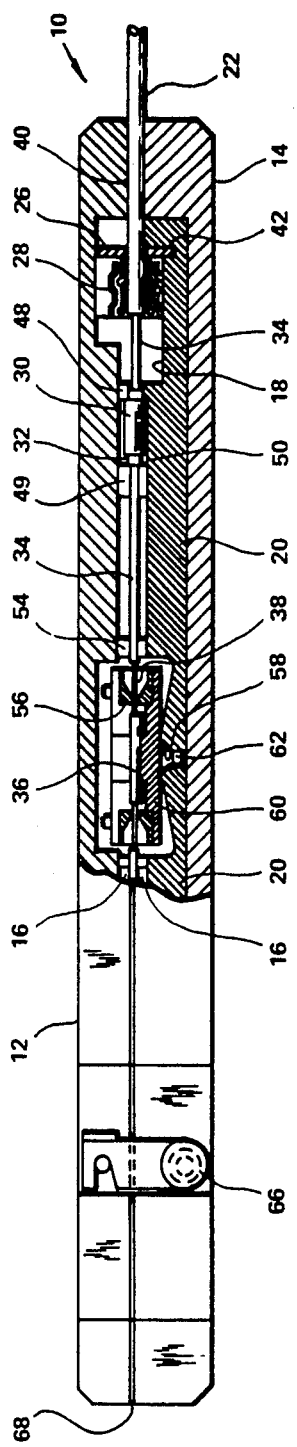
FIG. 2 is a side view in partial cross-section of a closed housing showing the sled and splice elements.
Figure 3:
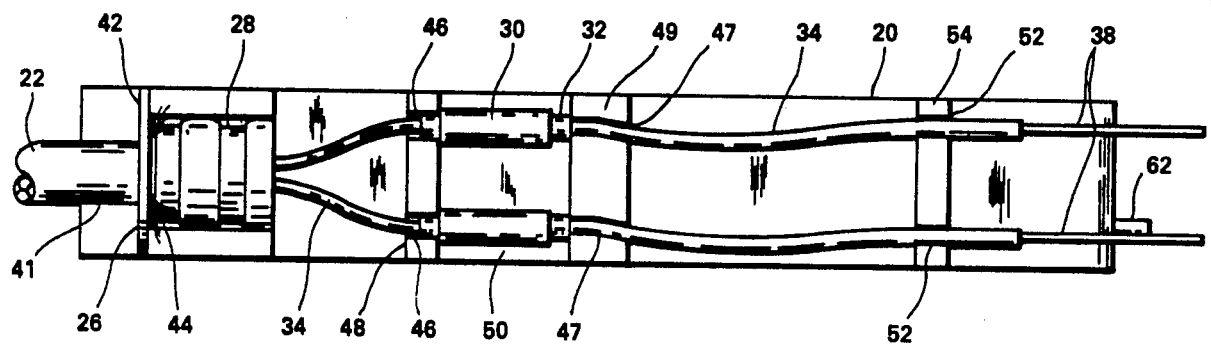
FIG. 3 is a plan view of the splice sled and elements mounted thereon.
Figure 4:
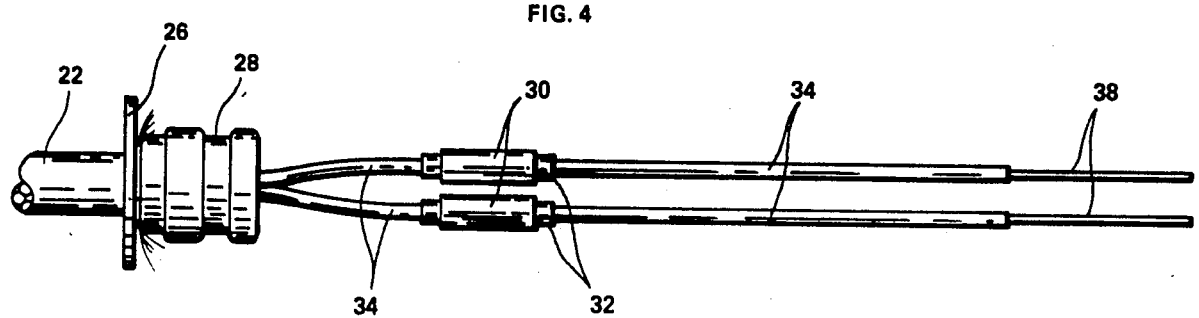
FIG. 4 is a plan view of the optical fibers and mounting elements.
Figure 5:
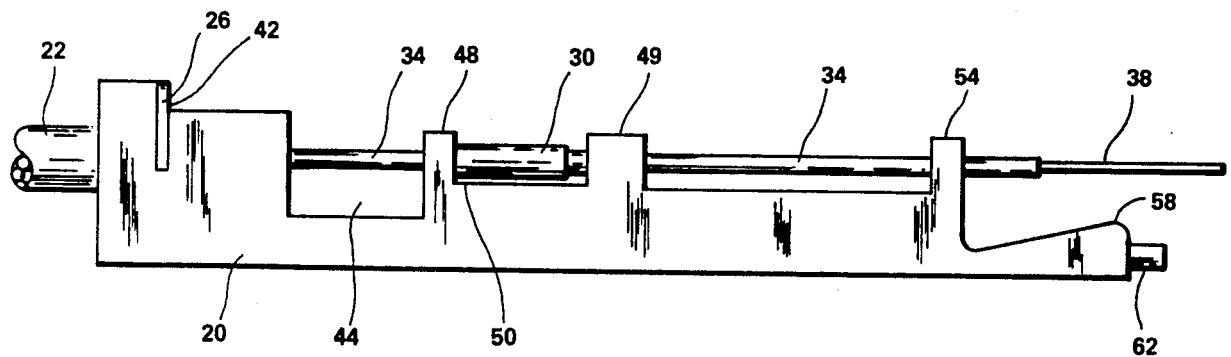
FIG. 5 is a side view of the splice sled and elements mounted thereon.

As shown in FIGS. 1 and 2, a longitudinal shell-like housing 10, having hinged upper and lower halves 12 and 14, includes axial recesses 16 and 18 along opposite sections of each half for accommodating a pair of removable splice sleds 20 and various optical fiber and mounting elements. The housing is preferably made from a strong and durable material that is corrosion resistant, such as aluminum or a filled engineering plastic, e.g., Lexan or Valox, in which the recesses can be manufactured to precise dimensions. The sleds 20 can be made from the same materials as the housing and fit snugly in the recesses in the lower half of the housing such that the sleds are disposed symmetrically about the transverse centerline of the housing.

Figure 6:
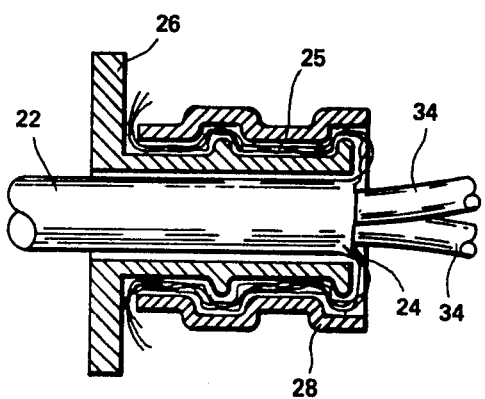
FIG. 6 is a side view in partial cross-section showing the flanged sleeve and the retainer sleeve crimped to secure the strength members of the cable therebetween.

A cable 22 containing a plurality of optical fibers 34 generally comprises an outer cable jacket 24, cable strength members 25, and the individual fibers 34 which are buffer-coated with materials such as Hytrel, silicone, or a combination of both materials. As shown in FIG. 6, the cable 22 and each individual optical fiber 34 to be spliced are prepared in advance by sliding a flanged sleeve 26 over the cable 22, cutting and stripping the outer jacket 24 of cable 22 to expose the strength members 25 of the cable, typically Kevlar. The strength members are folded back over the flanged sleeve 26 and a retainer sleeve 28 is placed over the folded back layer of strength members and the flanged sleeve 26. The retainer sleeve 28 is then crimped over the flanged sleeve 26 to secure in place the flanged sleeve, the strength members, and the retainer sleeve. The excess strands of the strength members protruding beyond the flanged sleeve can then be snipped off if desired. The flanged sleeve 26 is made from a strong and durable material which may be corrosion resistant, such as stainless steel, and preferably has a rough surface or projections on the surface thereof to more securely retain the crimped retainer sleeve in place with the strength members therebetween. The retainer sleeve 28 is preferably of a material which can be easily crimped, such as brass or aluminum.

A fiber locator sleeve 30, preferably made from a material which can be easily crimped, such as aluminum or brass, includes an elastomeric inner sleeve or liner 32 which protrudes from at least the proximal end of the locator sleeve. The locator sleeve 30 is slipped over each buffer-coated fiber 34 and crimped in a predetermined position relative to the distal end of the flanged sleeve 26. The locator sleeve 30 and liner 32 serve to prevent motion of the individual fibers in the sled, thereby providing strain relief, and to provide precise location of the fibers, thereby insuring contact of the strain-relieved fibers in guides 36. (The operation of the alignment guides, which are pre-installed in the housing, will be more fully described hereinafter.) The buffer-coating on each fiber is then stripped to expose the bare optical fibers 38 at a predetermined length beyond locator sleeves 30, preferably at a point after wall partition 54 but before the optical fiber enters tapered ring 56, which is about 1½" to 2½", depending upon the dimensions of sled 20. The bare optical fibers extend generally between approximately ¼" to ¾", more preferably between ⅜" to ⅝". The bare fiber ends are then scribed and cleaved so that the distance from the distal end of the locator sleeve 30 to the cleaved fiber end is an exact predetermined distance. Each exact distance referred to above will vary depending upon the size of the sleds utilized in a particular splicing device. However, it is important that in each device the distance between the cleaved fiber end and the distal end of locator sleeve 30 is a precise predetermined length in order to achieve proper alignment.

A second cable end containing the same number of optical fibers to be spliced with the optical fibers of the first cable end is prepared in a like manner for mounting on a second sled and insertion into the symmetrical opposite end of the housing.

Figure 7:
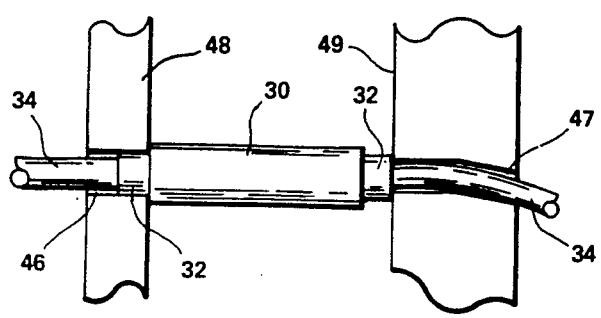
FIG. 7 is a side view in partial cross-section showing the placement of the locator sleeve having an elastomeric insert between wall partitions.

As shown in FIGS. 1, 3, 4, and 5, a pair of optical fibers contained in a cable is assembled with mounting members including respective splice sleds 20 which are temporarily removed from the housing. Cable end 22 is received in an end channel 41. Flanged sleeve 26 is pressed into a transverse slot 42, and retainer sleeve 28 is positioned in a longitudinal slot 44. The buffer coated fibers 34 are inserted into grooves 46 and 47 in wall partitions 48 and 49 at both ends of the locator sleeves 30. As shown in FIG. 7, the elastomeric liner 32 has an outer diameter which is larger than the width of the grooves 47 in the proximal wall partition 49. The elastomeric liner exerts a spring-like force as it abuts the wall partition 49 and causes the locator sleeve 30 to abut the distal wall partition 48. Should the elastomeric liner protrude from the distal end of locator sleeve 30, the grooves 46 in the distal wall partition 48 have an outer diameter which is greater than the outer diameter of the elastomeric insert but less than the outer diameter of the locator sleeve. This insures that the locator sleeve will be flush against the distal wall partition 48. The locator sleeves 30 are received between the partitions in a recess 50. The buffer-coated fibers are also inserted into additional grooves 52 in end partition 54 to complete the mounting of the assembled elements in one sled. The end partition 54 preferably has a retaining means (not shown), e.g., a gate, to ensure that the fibers are retained in grooves 52.

It should be noted that while grooves 46 and 52 are preferably linear, grooves 47 are preferably angled as shown in FIG. 7, e.g., an angle of 15 degrees, to predispose the fibers to form a slight bow or bend. Each of grooves 46, 47 and 52 have a width, slightly in excess of the outer diameter of the buffer-coated fiber.

The first sled is then reinserted into the corresponding recess 18 in the lower half 14 of housing 10 with the bare fiber ends 38 toward the alignment guides 36. Cable end 22 is received in channel 40 which may be ribbed to more securely retain the cable end and provide a seal when the housing is closed. As the sled is inserted and moved slightly toward the guides, the dimensions and tolerances of the fibers and support elements are such that the fibers enter internally funnel-shaped or tapered rings 56. The fiber ends 38 pass through the tapered rings and are directed simultaneously into alignment guides 36 to engage the internal grooved surfaces of the guides in a known manner. The extreme forward end of the sled includes a raised portion 58 which slides into a space under the guides support 60 and provides a close fit to maintain the sled and elements in position when the housing is closed. An elastomeric extension 62 on each sled resiliently causes the sleds to be pushed away from each other such that the distal end of the sled 20 abuts the distal end of recesses 16 and 18 in the lower half of the housing, thereby precisely locating the sleds within the housing.

A like operation is accomplished with the second sled holding an opposing pair of fibers having stripped and cleaved ends in the manner described above. The second sled is similarly inserted into the opposite housing recess with the fibers passing through another pair of tapered rings 56 and into the opposite ends of the alignment guides 36 until the opposing ends of the pairs of fibers abut and contact one another. It is preferred that the lengths of the fibers are cut slightly longer than required for the opposing ends to meet exactly at the center of the alignment guides so that upon engagement of the fiber ends, the intermediate fiber sections between wall partitions 49 and 54 form a slight bow or bend 64, as shown in FIG. 1, particularily if groove 47 is angled as noted above. This bend provides a light mutual spring force to maintain the fiber ends in contact. Additionally, the locator sleeves 30 may be positioned on each fiber such that a slight bow or bend will result between the flanged sleeve 26 and distal wall partition 48 to provide additional strain relief.

After insertion of the fiber ends into the alignment guides by movement of the splice sleds such that the fiber ends engage to form a splice within the guide, the splice housing is closed and latches 66 secured. A gasket 68 may be placed between the upper and lower halves of the splice housing to aid in forming a tight seal when the housing is matched. The latched housing provides retention of the sleds, spliced fibers and cable strength members, as well as environmental protection of the fibers and guides.

The alignment guide and cleaved ends provide an optical connection having an insertion loss of less than 1 dB. This may be further reduced by use of a silicone fluid within the guide. The fluid eliminates face reflections and Fresnel losses as well as losses from minor defects in the cleaved fiber end surfaces. The guides are pre-filled with the fluid which is retained in the narrow passage by internal surface tension.

The device of the present invention thus permits rapid simplified repair and splicing of optical fibers under adverse field conditions and achieves a precise alignment that can be performed by an operator wearing gloves while providing a rugged and secure connection. While only a single embodiment has been illustrated and described, it is apparent that many variations may be made in the particular design and configuration without departing from the scope of the invention as set forth in the appended claims.

What is claimed is:

1. A housing for splicing optical fibers comprising:
   first and second longitudinal mating integral shell portions having a pair of axial recesses at respective ends and a central recess therein for receiving optical fiber members and mounting members, and means for securing said shell portions together in a closed position to form a common enclosure surrounding said optical fiber and mounting members;
   a removable alignment guide for receiving opposite ends of optical fibers to be spliced, said guide being disposed in said central recess of one of said shell portions; and
   said mounting members including symmertrical first and second removable supports and retainer sleeves for holding optical fiber members, said supports having longitudinal slots for said retainer sleeves and grooves for said fibers, said supports being slidable within respective said axial recesses at opposite ends of said shell portions and central alignment guide to cause opposing optical fiber ends to enter said guide and engage to form a splice within said guide, said mating shell portions in said closed position retaining and securing said optical fiber and mounting members to maintain said splice.

2. The device of claim 1 wherein said shell portions, recesses, optical fiber and mounting members, removable supports and retainer sleeves and alignment guide are symmetrical about a transverse centerline of said housing.

3. The device of claim 2 wherein said optical fiber members are in respective common outer cables each having an end portion removed, each cable including a pair of separate buffer-coated optical fibers extending from said end portion, said retainer sleeves including a flanged sleeve and retainer sleeve secured about each said cable end and a surrounding a pair of locator sleeves respectively secured about said coated fibers.

4. The device of claim 3 wherein said alignment guide includes two parallel guide sections for receiving the respective ends of two pairs of optical fibers to be spliced.

5. The device of claim 4 wherein said optical fibers each have a portion with the buffer-coating removed and a cleaved end, said removable supports including a cable receiving channel at one end, a transverse slot for receiving said flanged sleeve, a first longitudinal slot for receiving said surrounding retainer sleeve, a pair of partitions spaced from said first slot having a second longitudinal slot therebetween for receiving said pair of locator sleeves, said partitions including pairs of grooves for receiving said optical fibers, a third partition at the opposite end having grooves for receiving said optical fibers, and an extended base having a raised end slidable under said alignment guide for engagement therewith.

6. The device of claim 5 wherein said alignment guide includes pairs of internally tapered rings at the ends of said two parallel alignment guide sections for directing respective pairs of fibers into said alignment guide.

7. The device of claim 5 wherein said locator sleeves include an inner elastomeric sleeve extending from at least one end thereof to restrict movement of said fibers in said removable support and to provide precise location of said fibers.

8. The device of claim 5 wherein said opposing optical fibers are of a given length so that the ends project beyond the centerline of said alignment guide to cause a bend at an intermediate portion spaced from said ends upon engagement of said ends, said fiber bend being positioned between said pair of partitions and said third partition of said support and providing a spring force to maintain said fiber ends in engagement.

9. The device of claim 5 wherein said mating shell portions are hinged together along one side and include latches along the other side.

10. The device of claim 5 wherein said raised end of the extended base of the first removable support includes an elastomeric extension to contact said raised end of the second removable support such that the first and second removable supports are pushed away from each other and are precisely located within said axial recesses.

11. An optical fiber splicing device comprising:
   a housing having first and second longitudinal mating shell portions including axial recesses therein for receiving optical fiber members and mounting members, and means for securing said shell portions together to enclose said optical fiber and mounting members, said optical fiber members being in respective common outer cables each having an end portion removed, each cable including at least two separate buffer-coated optical fibers extending from said end portion;

an alignment guide for receiving opposing ends of optical fibers to be spliced, said guide being disposed centrally in a recess of one of said shell portions, said alignment guide including at least two parallel guide sections for receiving the respective ends of at least two pairs of optical fibers to be spliced and an internally tapered ring at each end of each parallel guide section for directing respective pairs of fibers into said alignment guides;

said mounting members including first and second removable supports and retainers for holding optical fiber members, said retainers including a flanged sleeve and retainer sleeve secured about each said cable and a pair of locator sleeves respectively secured about each said coated fiber, said locator sleeves having an inner elastomeric sleeve extending from at least one end thereof to restrict movement of said fibers in said removable support and to provide precise location of said fibers, said supports having a cable receiving channel at one end, a transverse slot for receiving said flanged sleeve, a first longitudinal slot for receiving said retainer sleeve, a pair of partitions spaced from said first slot having a second longitudinal slot therebetween for receiving said pair of locator sleeves, said partitions including at least two grooves for receiving said optical fibers, a third partition at the opposite end having grooves for receiving said optical fibers, and an extended base having a raised end slidable under said alignment guide for engagement therewith; and said supports being slidable within respective recesses at opposite ends of said alignment guide to cause opposing optical fiber ends to enter said guide and engage to form a splice within said guide, said housing retaining and securing said supports and optical fiber members and mounting members when said shell portions are secured together.

12. The device of claim 11 wherein said opposing optical fibers are of a given length so that the ends project beyond the centerline of said alignment guide to cause a bend at an intermediate portion spaced from said ends upon engagement of said ends, said fiber end being positioned between said pair of partitions and said third partition of said support and providing a spring force to maintain said fiber ends in engagement.

13. The device of claim 11 wherein said raised end of the extended base of the first removable support includes an elastomeric extension to contact said raised end of the second removable support such that the first and second removable supports are pushed away from each other and are precisely located within said axial recesses.

* * * * *